US011211029B2

(12) United States Patent
Cheon et al.

(10) Patent No.: US 11,211,029 B2
(45) Date of Patent: Dec. 28, 2021

(54) ELECTRONIC DEVICE WITH IMPROVED VISIBILITY OF USER INTERFACE

(71) Applicant: Samsung Electronics Co., Ltd., Gyeonggi-do (KR)

(72) Inventors: Dongyeong Cheon, Gyeonggi-do (KR); Minkyu Park, Gyeonggi-do (KR); Daewon Kim, Gyeonggi-do (KR); Siwan Kim, Gyeonggi-do (KR); Ukhyun Kim, Gyeonggi-do (KR); Junho Lee, Gyeonggi-do (KR); Eunsil Lim, Gyeonggi-do (KR); Jungwoo Choi, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/023,752

(22) Filed: Sep. 17, 2020

(65) Prior Publication Data
US 2021/0110786 A1    Apr. 15, 2021

(30) Foreign Application Priority Data
Oct. 10, 2019    (KR) .......................... 10-2019-0125530

(51) Int. Cl.
*G09G 5/00* (2006.01)
*G09G 5/02* (2006.01)
(Continued)

(52) U.S. Cl.
CPC .............. *G09G 5/026* (2013.01); *G06T 7/90* (2017.01); *G09G 5/37* (2013.01); *G06F 3/0482* (2013.01);
(Continued)

(58) Field of Classification Search
CPC ......... G09G 2320/066; G09G 2340/14; G09G 2320/0686; G09G 2340/0407;
(Continued)

(56) References Cited

U.S. PATENT DOCUMENTS 6,788,308 B2    9/2004 Reavy et al.
9,288,462 B2    3/2016 Vlahos et al.
(Continued)

FOREIGN PATENT DOCUMENTS

KR    10-2018-0109368 A    10/2018

OTHER PUBLICATIONS

International Search Report dated Dec. 10, 2020.

*Primary Examiner* — Hau H Nguyen
(74) *Attorney, Agent, or Firm* — Cha & Reiter, LLC

(57) ABSTRACT

An electronic device and method are disclosed herein. The electronic device includes a display, and a processor. The processor implements the method, including: acquiring a background image of a screen generated for display, a region of interest (ROI) where a user interface (UI) element is to be displayed, calculating a value indicating a shape complexity of the ROI, dividing the ROI into a plurality of clusters according to designated attributes, calculating difference values indicating a contrast between each of the plurality of clusters and the UI element, identifying a minimum difference value from among the difference values as a contrast difference value, calculating a result value indicating a degree of visibility of the UI element relative to the background image, determining an image effect to be applied to the UI element, based on the result value, and display to the altered ROI the UI element.

20 Claims, 10 Drawing Sheets

(51) Int. Cl.
  *G06T 7/90* (2017.01)
  *G09G 5/37* (2006.01)
  *G06F 3/0482* (2013.01)

(52) U.S. Cl.
  CPC .............. *G06T 2207/20021* (2013.01); *G09G 2320/0666* (2013.01); *G09G 2340/12* (2013.01); *G09G 2340/14* (2013.01); *G09G 2354/00* (2013.01)

(58) Field of Classification Search
  CPC .. G09G 2354/00; G09G 2360/16; G09G 5/30; G06F 3/0482; G06F 9/451; G06T 2207/20021; G06T 7/50; G06T 7/60
  See application file for complete search history.

(56) References Cited

U.S. PATENT DOCUMENTS

| | | |
|---|---|---|
| 9,542,907 B2 | 1/2017 | Kocienda et al. |
| 10,290,110 B2 | 5/2019 | Lawrence et al. |
| 10,319,116 B1 | 6/2019 | C et al. |
| 2005/0100212 A1 | 5/2005 | Eguchi et al. |
| 2009/0316989 A1 | 12/2009 | Barbieri et al. |
| 2012/0127198 A1 | 5/2012 | Gundavarapu |
| 2012/0188243 A1 | 7/2012 | Fujii et al. |
| 2014/0015830 A1* | 1/2014 | Hong ....................... G06T 5/10 345/419 |
| 2016/0358592 A1 | 12/2016 | Rogoyski et al. |

* cited by examiner

ELECTRONIC DEVICE WITH IMPROVED VISIBILITY OF USER INTERFACE

CROSS-REFERENCE TO RELATED APPLICATION(S)

This application is based on and claims priority under 35 U.S.C. 119 to Korean Patent Application No. 10-2019-0125530, filed on Oct. 10, 2019, in the Korean Intellectual Property Office, the disclosures of which are herein incorporated by reference in their entireties.

BACKGROUND

Field

The disclosure relates to an electronic device, and more particularly, to a device executing image processing that improves visibility of a screen displayed on a display.

Description of Related Art

An operating environment of an electronic device may include a background image, and one or more user interface (UI) elements disposed thereon. The electronic device may perform image processing to clarify display of a UI element for easier viewing by the user.

When the background image includes display of a complex shape, it may be difficult for a user to visually identify the UI element. For example, if the background is white and the UI element is black, this clear difference in color generally produces no problem in identifying the UI element. However, if the background image is formed of various colors, the complexity thereof may render it quite difficult to identify the UI element.

SUMMARY

Certain embodiments of the disclosure may provide an electronic device configured to apply an appropriate image effect to a UI element so that the UI element can be easily recognized even if a background image is complicated in shape and/or color.

According to certain embodiments of the disclosure, an electronic device may include a display, a processor operatively connected to the display, and a memory operatively connected to the processor, wherein the memory stores instructions that cause, when executed, the processor to: acquire, in a background image of a screen generated for display on the display, a region of interest (ROI) where a user interface (UI) element is to be displayed, calculate a value indicating a shape complexity of the ROI, divide the ROI into a plurality of clusters according to designated attributes for each of the plurality of clusters, calculate difference values indicating a contrast between each of the plurality of clusters and the UI element, identify a minimum difference value from among the difference values and setting the identified minimum difference value as a contrast difference value, calculate, using the shape complexity value and the contrast difference value, a result value indicating a degree of visibility of the UI element relative to the background image, determine an image effect to be applied to the UI element based on the result value, and display to the ROI the UI element to which the image effect is applied.

According to certain embodiments of the disclosure, a method for operating an electronic device may include acquiring a background image of a screen generated for display on the display, a region of interest (ROI) where a user interface (UI) element is to be displayed, calculating a value indicating a shape complexity of the ROI, dividing the ROI into a plurality of clusters according to designated attributes for each of the plurality of clusters, calculating difference values indicating a contrast between each of the plurality of clusters and the UI element, identifying a minimum difference value from among the difference values and setting the identified minimum difference value as a contrast difference value, calculating, using the shape complexity value and the contrast difference value, a result value indicating a degree of visibility of the UI element relative to the background image, determining an image effect to be applied to the UI element, based on the result value, and display to the ROI the UI element to which the image effect is applied.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

Hereinafter, embodiments of the disclosure will be described in detail with reference to the accompanying drawings.

Figure 1:
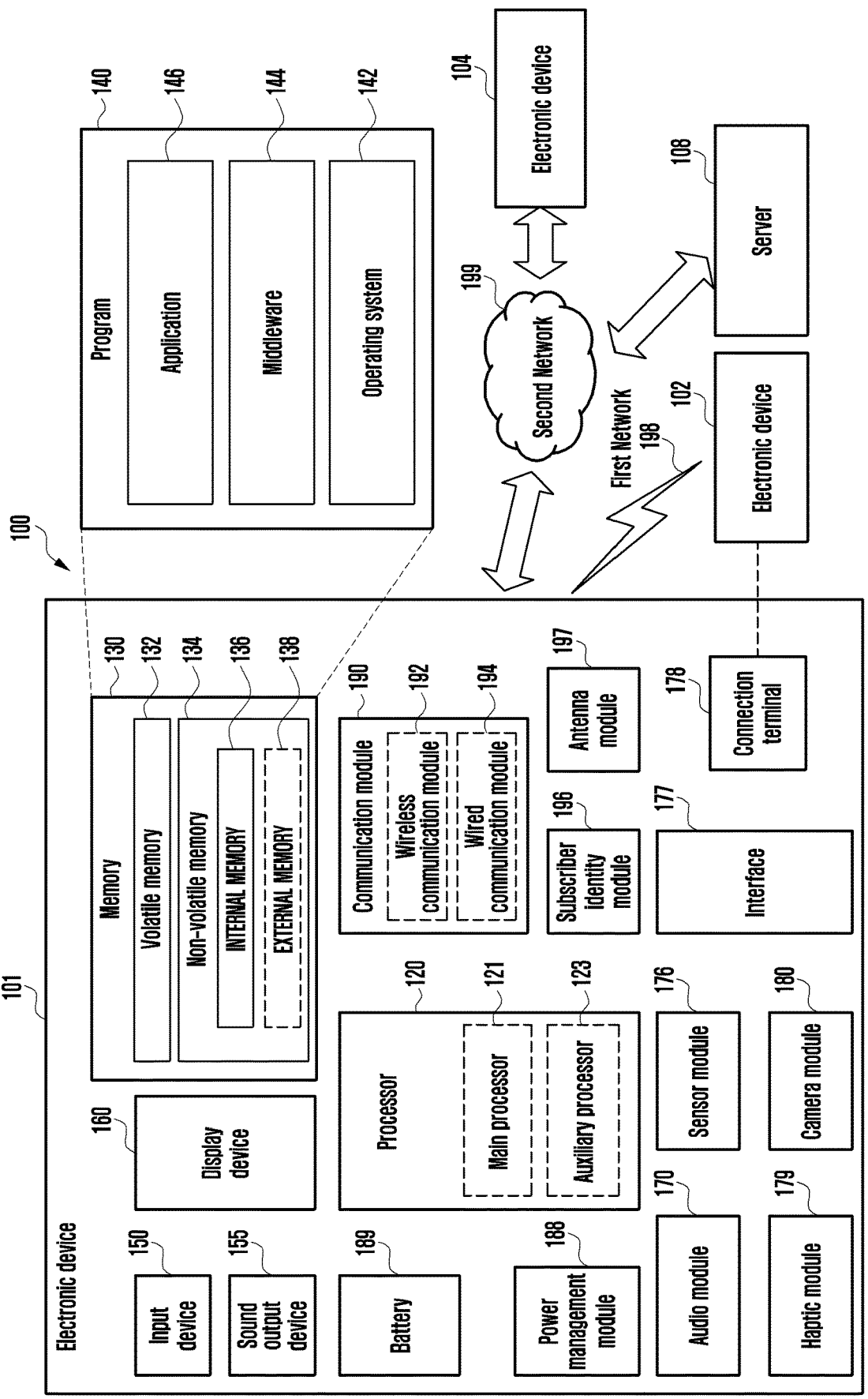
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented by a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
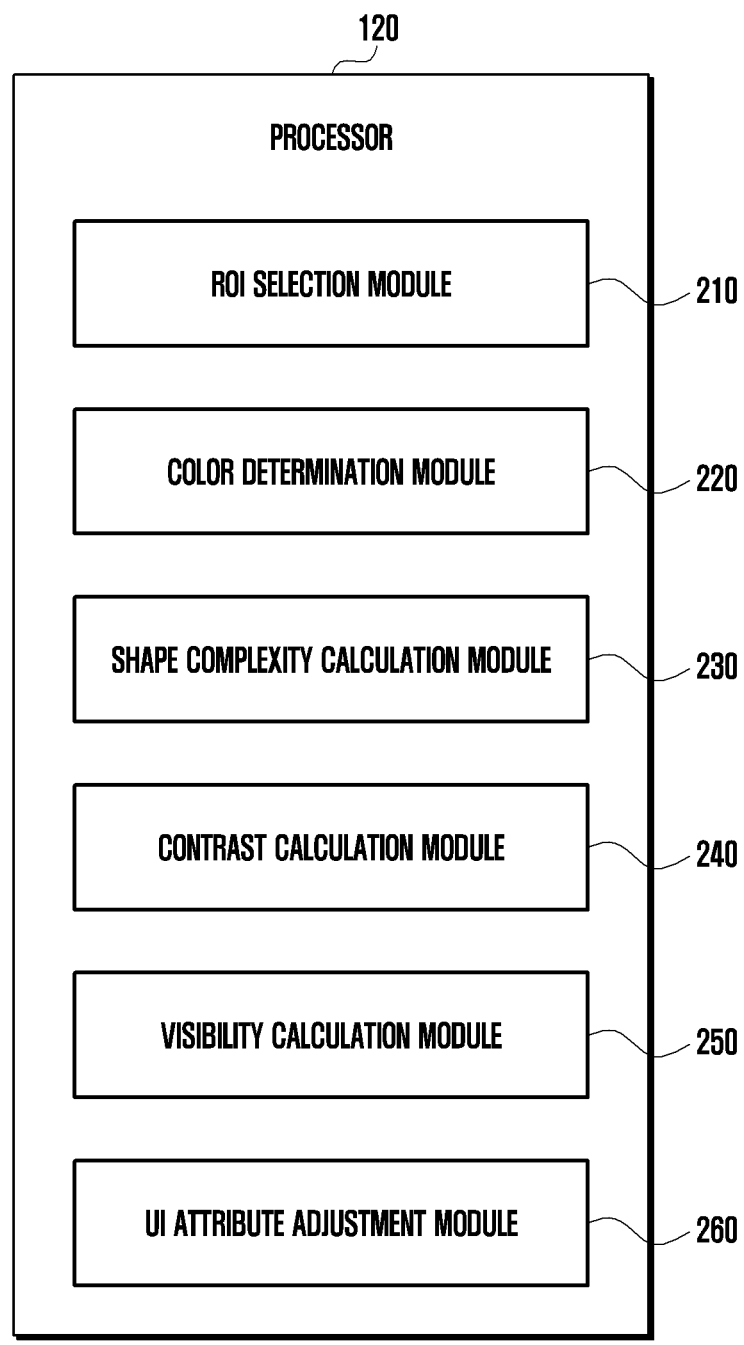
FIG. 2 illustrates a processor configured to perform an operation for improving visibility according to certain embodiments.

FIG. 2 illustrates a processor 120 configured to perform an operation for improving visibility according to certain embodiments.

Referring to FIG. 2, the processor 120 may include a region-of-interest (ROI) selection module 210, a color determination module 220, a shape complexity calculation module 230, a contrast calculation module 240, a visibility (or legibility) calculation module 250, and/or a user interface (UI) attribute adjustment module 260. At least one of the above modules 210, 220, 230, 240, 250, and 260 may be implemented in the electronic device 101 as hardware separate from the processor 120. In addition, at least one of the above modules 210, 220, 230, 240, 250, and 260 may be software stored in the memory 130, and the processor 120 can execute the software.

The ROI selection module 210 may select, in an image designated as a background, an ROI at which a UI element is to be located. A lock screen or home screen may be implemented using a background image and a UI element (i.e., foreground) represented thereon. The UI element may include, for example, a text, a button, an icon, and/or an emoticon. In an embodiment, the ROI selection module 210 may select a default region in the background as the ROI. In another embodiment, the ROI selection module 210 may determine the ROI in the background, based on a user input. For example, the ROI selection module 210 may represent, on a display, a setting menu that allows the user to directly select a place where the UI element (e.g., time, weather information) is to be located. In this case, the ROI selection module 210 may receive a user input (e.g., a touch input) through the setting menu and, based on the received user input, complete the selection of the ROI.

The color determination module 220 may determine a color of the UI element. In an embodiment, the color determination module 220 may determine a default color (e.g., white or black) as the color of the UI element. In another embodiment, the color determination module 220 may represent, on the display, a setting menu that allows the user to directly select the color of the UI element. Then, based on a user input received through the setting menu, the color determination module 220 may complete the determination of the color. In still another embodiment, the color determination module 220 may perform color profiling for the background image and determine the color of the UI element based on a result of color profiling. For example, the color determination module 220 may determine a certain color contrasting with the color of the background image as the color of the UI element. That is, if the color of the background image is analyzed as a dark series as a result of color profiling, the color determination module 220 may determine the color of the UI element as a bright series, for example, white. In addition, if the color of the background image is analyzed as a bright series as a result of color profiling, the color determination module 220 may determine the color of the UI element as a dark series, for example, black.

The shape complexity calculation module 230 may calculate a value indicating a shape complexity of the ROI. In an embodiment, the shape complexity calculation module 230 may convert the ROI to grayscale. Then, the shape complexity calculation module 230 may determine an average of all pixel values of the ROI converted to grayscale as the shape complexity value to be used for UI attribute adjustment. In another embodiment, for an efficient calculation, the shape complexity calculation module 230 may perform a process of reducing the ROI as a pre-processing process of the grayscale conversion. In still another embodiment, in order to improve the accuracy of a calculation, the shape complexity calculation module 230 may perform, as a post-processing process of the grayscale conversion, a process of removing a pixel value having a low frequency than a predetermined reference value by using a high pass filter (HPF) (e.g., an algorithm of a well-known photo editing tool).

The contrast calculation module 240 may calculate a difference value indicating a contrast (e.g., a difference in hue, saturation, or value (which means brightness in this disclosure)) between the ROI, selected by the ROI selection module 210, and the UI element. In an embodiment, the contrast calculation module 240 may divide the ROI into a plurality of clusters according to each designated attribute. In certain embodiments, such attributes to be used for division may include at least one of hue (H), saturation (S), and value (V) (i.e., brightness). For example, the contrast calculation module 240 may divide the ROI into the clusters, based on HSV. Thus, the clusters may have different HSVs. The contrast calculation module 240 may calculate difference values between the clusters and the UI element. When calculating the difference values, the contrast calculation module 240 may exclude a cluster that does not satisfy a specified condition. For example, a cluster that occupies the ROI at a ratio below a threshold may not affect visibility, so that this cluster may be excluded from the calculation of the difference values. The contrast calculation module 240 may determine the smallest difference value among the difference values as a contrast difference value to be used in a visibility calculation of the UI element.

The visibility calculation module 250 may calculate a result value indicating a degree of visibility of the UI element by using the shape complexity value and the contrast difference value. In an embodiment, the visibility calculation module 250 may calculate the result value by applying a higher weight to the shape complexity value than to the contrast difference value. A high result value may mean that it is difficult to recognize the corresponding UI element, and a low result value may mean that it is easy to recognize the corresponding UI element. In the following description, the result value will be used in the above sense, but the meaning of the result value may be opposite to the above depending on a result value calculation method.

The UI attribute adjustment module 260 may perform image processing on the UI element, based on the result value.

In an embodiment, the UI attribute adjustment module 260 may improve the visibility of the UI element by applying a shadow effect to an edge of the UI element based on the result value. The attributes of the shadow effect may include the size of a shadow and/or the opacity of the shadow. For example, the UI attribute adjustment module 260 may adjust the shadow to be larger and/or opaque as the result value is higher. On the contrary, the UI attribute adjustment module 260 may adjust the shadow to be smaller and/or transparent as the result value is lower.

In another embodiment, the UI attribute adjustment module 260 may apply the shadow effect to the edge of the entire UI element (also known as a general adaptive shadow method). For example, the UI attribute adjustment module 260 may calculate a difference (hereinafter, a Max–Min difference value) between the smallest difference value and the greatest difference value among the difference values obtained by the contrast calculation module 240. When the Max–Min difference value is smaller than a first predetermined reference value, the UI attribute adjustment module 260 may select the general adaptive shadow method as the shadow effect to be applied to the UI element. In another example, when the shape complexity value obtained by the shape complexity calculation module 230 is greater than or equal to a second predetermined reference value, the UI attribute adjustment module 260 may select the general adaptive shadow method as the shadow effect to be applied to the UI element. In still another example, when the smallest difference value (i.e., the contrast difference value) among the difference values obtained by the contrast calculation module 240 is greater than or equal to a third predetermined reference value, the UI attribute adjustment module 260 may select the general adaptive shadow method as the shadow effect to be applied to the UI element.

In still another embodiment, the UI attribute adjustment module 260 may apply the shadow effect to the edge of a part of the UI element (also known as a partial adaptive shadow method). For example, the UI attribute adjustment module 260 may apply the shadow effect to the edge of a portion (e.g., but not an interior of the portion), located in a certain cluster corresponding to the contrast difference value, in the UI element. When the Max–Min difference value is greater than or equal to the first reference value, the UI attribute adjustment module 260 may select the partial adaptive shadow method as the shadow effect to be applied to the UI element. If the general adaptive shadow is applied even though the Max–Min difference value is greater than the first reference value, the contrast between the background and the UI element is excessive, and thus an aesthetic sense of the UI may be deteriorated. In another example, when the shape complexity value obtained by the shape complexity calculation module 230 is smaller than the second reference value, the UI attribute adjustment module 260 may select the partial adaptive shadow method as the shadow effect to be applied to the UI element. In still another example, when the contrast difference value is smaller than the third reference value, the UI attribute adjustment module 260 may select the partial adaptive shadow method as the shadow effect to be applied to the UI element.

In a certain embodiment, in order to further improve the visibility of the UI element by clearing the contrast between the background and the UI element, the UI attribute adjustment module 260 may use an image processing method for interposing an intermediate layer (e.g., a dim or transparent monochromatic layer) between the background and the UI element (also known as an adaptive layout method). When the result value exceeds a fourth predetermined reference value, the UI attribute adjustment module 260 may select the adaptive layout method. As such, in order to improve the visibility of the UI element, the UI attribute adjustment module 260 may additionally select the adaptive shadow method (e.g., the general adaptive shadow method or the partial adaptive shadow method) as well as the adaptive layout method.

Figure 3:
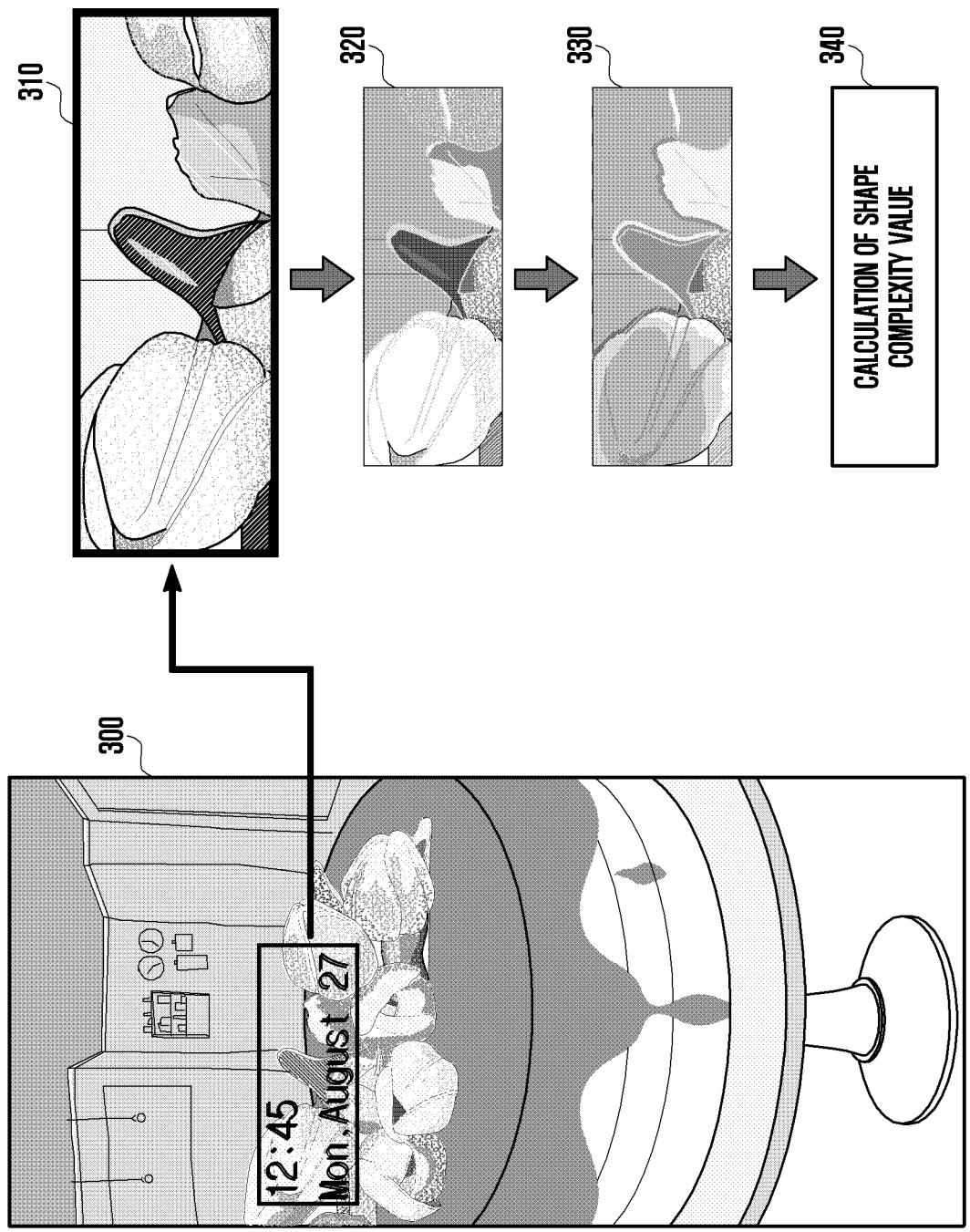
FIG. 3 is a diagram illustrating an operation of a processor to select a region of interest (ROI) and calculate a complexity according to certain embodiments.

FIG. 3 is a diagram illustrating an operation of a processor 120 to select a ROI and calculate a complexity according to certain embodiments.

Referring to FIG. 3, the processor 120 may acquire (e.g., crop) the ROI 310 in an image 300 designated as a background of a screen (e.g., a lock screen or a home screen). The processor 120 may generate a first image 320 by reducing the ROI 310 (e.g., in size) and converting it to grayscale. Then, the processor 120 may generate a second image 330 to be used for a shape complexity calculation by enabling the first image 320 to pass through a prepared HPF. Also, the processor 120 may perform an operation 340 of calculating an average (i.e., a shape complexity value) of pixel values of the second image 330.

Figure 4:
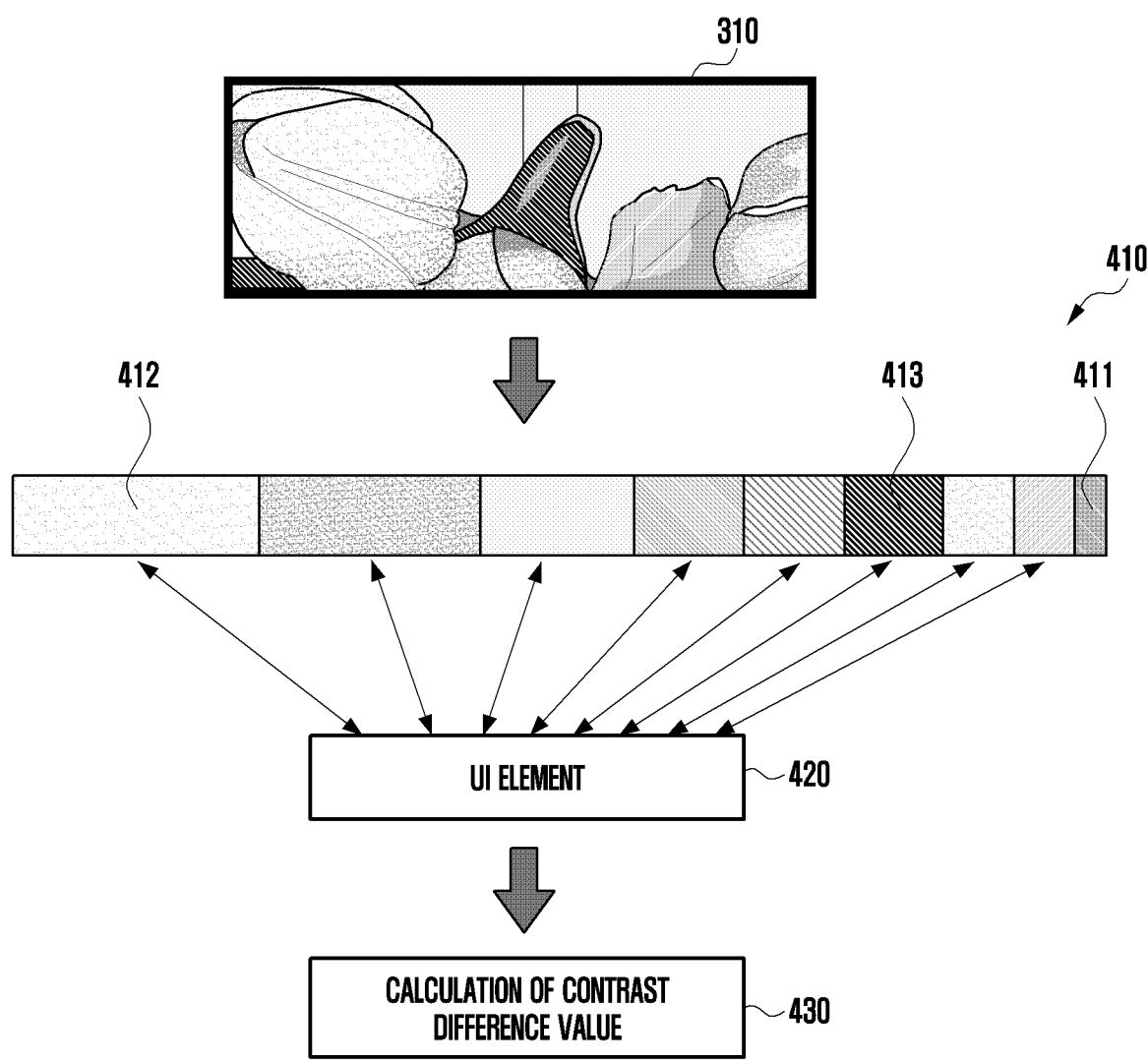
FIG. 4 is a diagram illustrating an operation of a processor to calculate a contrast between an ROI and a UI element according to certain embodiments.

FIG. 4 is a diagram illustrating an operation of a processor 120 to calculate a contrast between an ROI and a UI element according to certain embodiments.

Referring to FIG. 4, the processor 120 may divide the ROI 310 into clusters 410 each having the same HSV. The processor 120 may exclude, from a comparison target, a specific cluster 411 that occupies the ROI 310 at a ratio below a threshold. The processor 120 may calculate difference values by comparing the remaining clusters, except the specific cluster 411, with the UI element 420, and then perform an operation 430 of determining the smallest difference value (e.g., a difference value corresponding to a first cluster 412) as a contrast difference value. Additionally, the processor 120 may determine a difference between the smallest difference value and the greatest difference value (e.g., a difference value corresponding to a second cluster 413) as a Max–Min difference value to be used in selecting a method (e.g., the adaptive layout method, the partial adaptive shadow method, or the general adaptive shadow method) for adjusting the attributes of the UI element 420.

Figure 5:
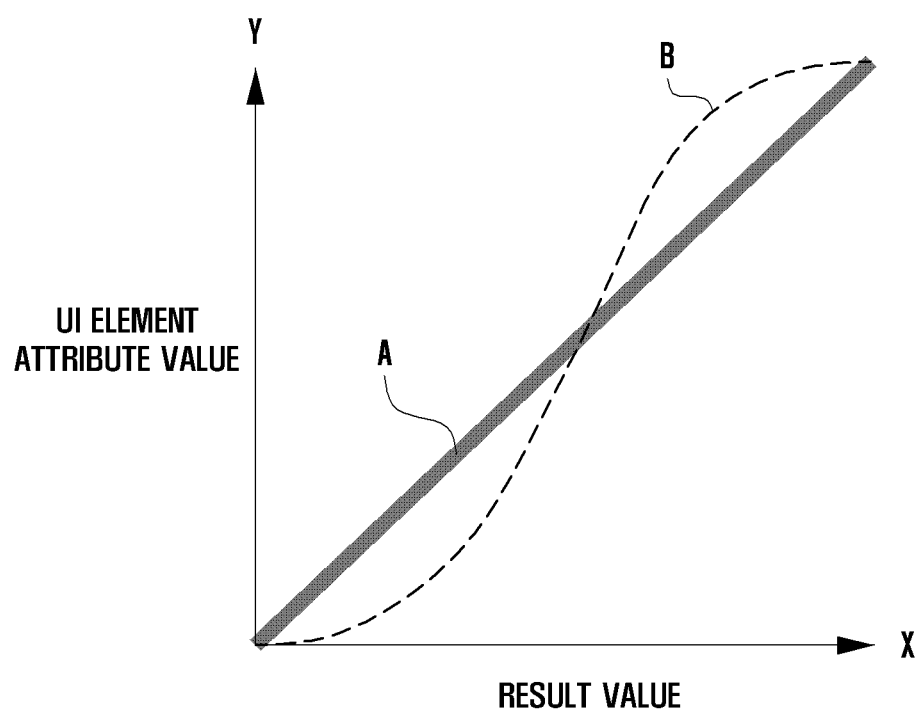
FIG. 5 is a graph illustrating an operation of a processor to determine an attribute value of a UI element according to certain embodiments.

FIG. 5 is a graph illustrating an operation of a processor 120 to determine an attribute value of a UI element according to certain embodiments.

Referring to FIG. 5, the X-axis of the graph denotes the result value calculated by the processor 120 using the shape complexity value and the contrast difference value. As the x value increases, it may be difficult to identify the UI element. The Y-axis of the graph denotes the attribute value of the UI element. For example, the attribute values may include a shadow size and/or a shadow opacity. As the y value increases, the shadow may be adjusted to be larger and opaque. The processor 120 may obtain the attribute value from a graph A or B. The graph A shows that the attribute value y increases continuously (or linearly) as the result value x increases. The graph B shows that the attribute value y increases nonlinearly in the form of a sinusoid as the result value x increases. That is, the meaning of the graph B is that when the identification of the UI element is possible, the attribute value is gradually increased to a level that does not feel a change, and when the identification of the UI element is impossible, the attribute value is significantly increased, as compared to the graph A, such that the contrast between the background and the UI element becomes clearly visible.

Figure 6:
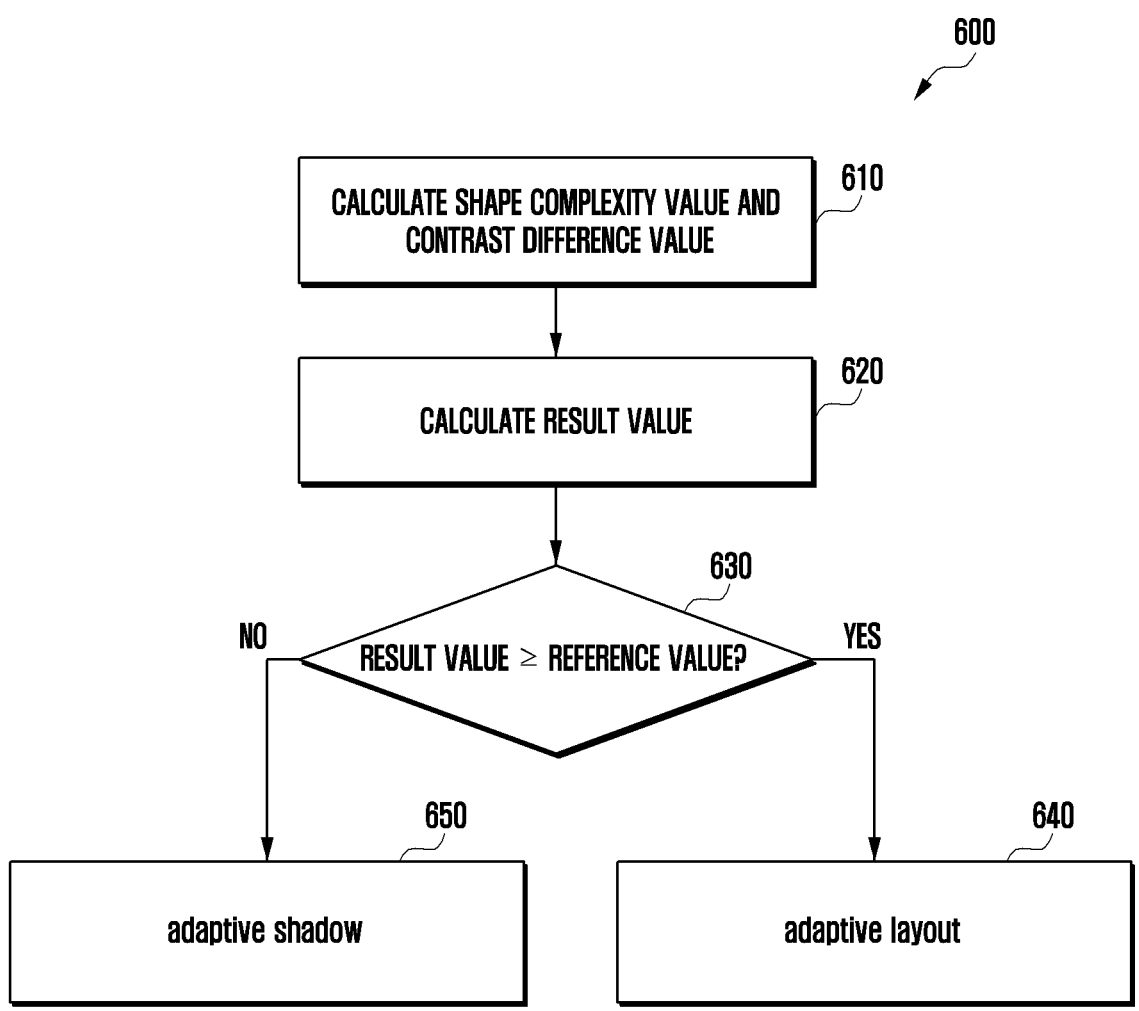
FIG. 6 is a flow diagram illustrating operations of a processor to adjust an attribute of a UI element according to certain embodiments.

FIG. 6 is a flow diagram illustrating operations 600 of a processor 120 to adjust an attribute of a UI element according to certain embodiments. For convenience, operations that overlap those described above are briefly described. Referring to FIG. 6, the processor 120 may perform the operations 600 by using the above-described modules 230, 240, 250, and 260.

At operation 610, the processor 120 may calculate the value indicating the shape complexity of the ROI and also calculate the contrast difference value between the ROI and the UI element.

At operation 620, the processor 120 may calculate the result value using the shape complexity value and the contrast difference value. At this time, the processor 120 may calculate the result value by applying a higher weight to the shape complexity value than to the contrast difference value. Also, the processor 120 may calculate the Max–Min difference value indicating the difference between the smallest difference value (e.g., a difference value corresponding to the first cluster 412 in FIG. 4) and the greatest difference value (e.g., a difference value corresponding to the second cluster 413 in FIG. 4). Alternatively, the calculation of the Max–Min difference value may be performed later (e.g., at operation 650).

At operation 630, the processor 120 may determine whether or not the result value is greater than or equal to a predetermined reference value (e.g., the fourth reference value).

If the result value is greater than or equal to the reference value (i.e., in case of YES at the operation 630), the processor 120 may perform, at operation 640, an image processing method (i.e., the adaptive layout method) for interposing an intermediate layer (e.g., a dim or transparent monochromatic layer) between the background and the UI element. The processor 120 may further apply the above-described adaptive shadow method (e.g., the general adaptive shadow method or the partial adaptive shadow method) to the UI element.

If the result value is smaller than the reference value (i.e., in case of NO at the operation 630), the processor 120 may apply, at operation 650, a shadow effect (i.e., the adaptive shadow method) to the edge of at least a part of the UI element, based on the result value. For example, using the graph A or B of FIG. 5, the processor 120 may determine the attribute value of the UI element matching the result value. Then, using the determined attribute value, the processor 120 may apply the adaptive shadow method to the edge of at least a portion of the UI element.

In an embodiment, the processor 120 may determine whether the previously calculated Max–Min difference value is greater than or equal to a predetermined reference value (e.g., the first reference value). Alternatively, the processor 120 may calculate the Max-Min difference value and determine whether the calculated Max–Min difference value is greater than or equal to the reference value. If the Max–Min difference value is greater than or equal to the reference value, the processor 120 may apply the shadow effect to the edge of a part of the UI element (i.e., the partial adaptive shadow method). For example, using the determined attribute value, the processor 120 may perform shadow processing on the edge of a portion (e.g., a word or character) overlapped with a cluster corresponding to the contrast difference value in the UI element. If the Max–Min difference value is smaller than the reference value, the processor 120 may apply the shadow effect to the edge of the entire UI element (i.e., the general adaptive shadow method). For example, using the determined attribute value, the processor 120 may perform shadow processing on the edge of the entire UI element.

In another embodiment, the processor 120 may select, based on the shape complexity, the general adaptive shadow method or the partial adaptive shadow method as the shadow effect to be applied to the UI element. For example, the processor 120 may select the general adaptive shadow method as the shadow effect to be applied to the UI element when the shape complexity value calculated at the operation 610 is greater than or equal to a predetermined reference value (e.g., the second reference value), and may select the partial adaptive shadow method as the shadow effect to be applied to the UI element when the shape complexity value is smaller than the reference value.

In still another embodiment, the processor 120 may select, based on the contrast difference value, the general adaptive shadow method or partial adaptive shadow method as the shadow effect to be applied to the UI element. For example, the processor 120 may select the general adaptive shadow method as the shadow effect to be applied to the UI element when the contrast difference value calculated at the operation 610 is equal to or greater than a predetermined reference value (e.g., the third reference value), and may select the partial adaptive shadow method as the shadow effect to be applied to the UI element when the contrast difference value is smaller than the reference value.

Figure 7A:
FIGS. 7A to 7C are diagrams illustrating comparative examples before and after applying an image effect to a UI element.
Figure 7A:
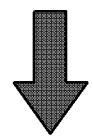
Figure 7A:
Figure 7B:
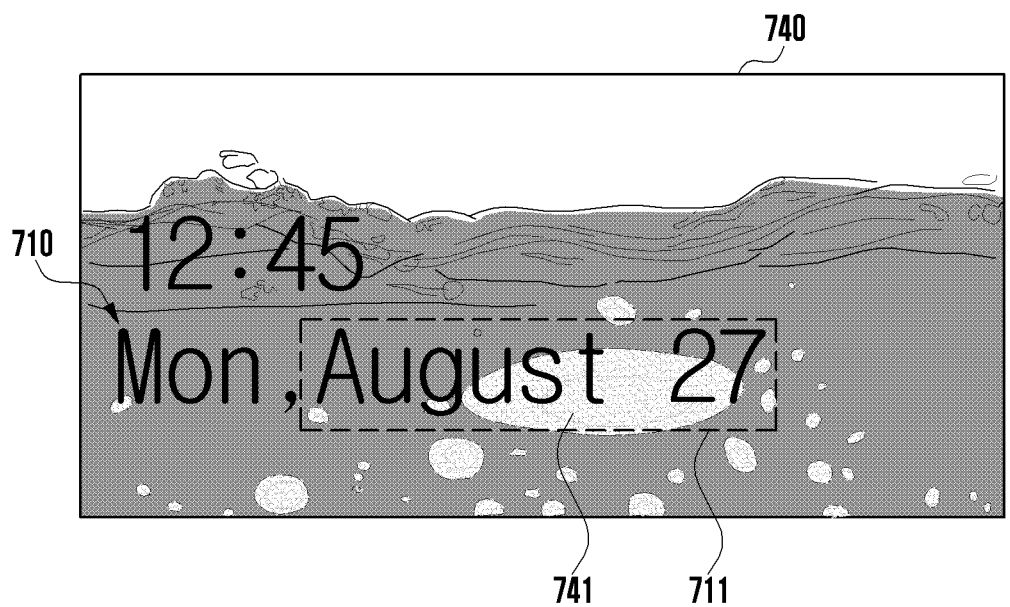
Figure 7B:
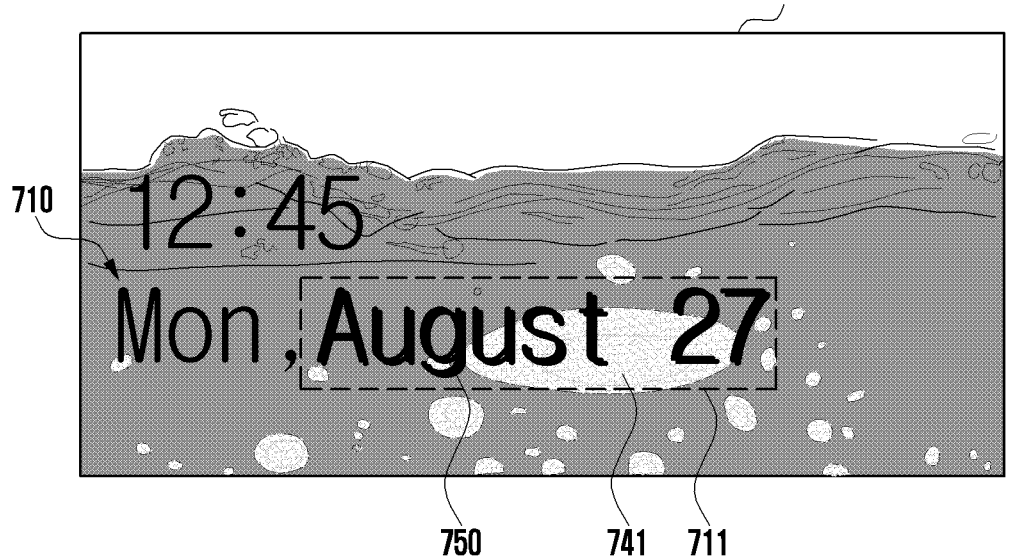
Figure 7C:
Figure 7C:
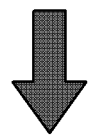
Figure 7C:
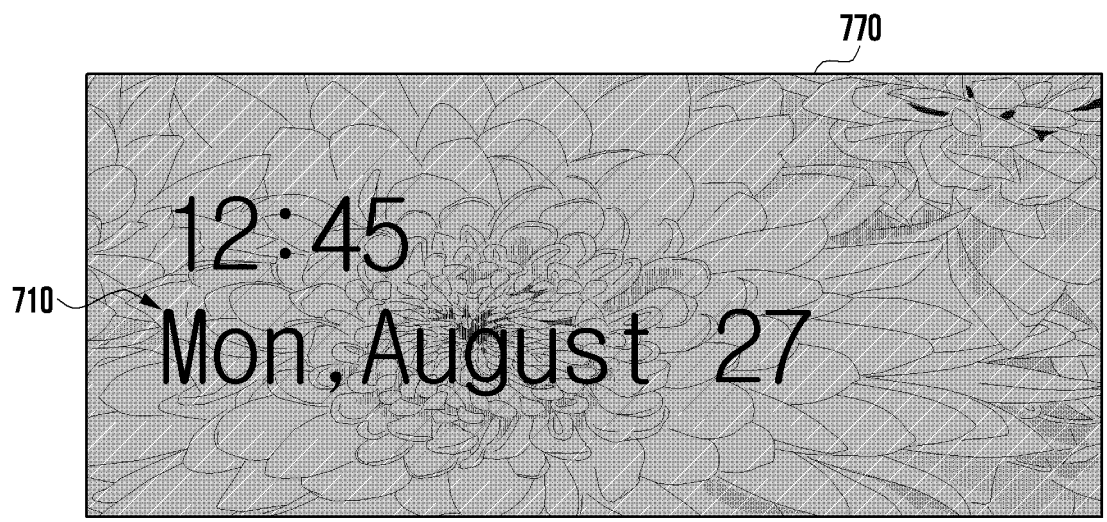

FIGS. 7A to 7C are diagrams illustrating comparative examples before and after applying an image effect to a UI element.

Referring to FIG. 7A, when a UI element 710 is represented on a first ROI 720, the contrast may not be clear, resulting in reduced visibility of the UI element 710, which is problematic. However, applying a shadow effect 730 to the edge of the entire UI element 710 according to the above-described embodiment (i.e., the general adaptive shadow method) may improve the visibility of the UI element 710.

Referring to FIG. 7B, when the UI element 710 is represented on a second ROI 740, a part 711 of the UI element 710 does not contrast with a portion 741 of the second ROI 740 overlapped therewith, thus being unidentifiable. However, applying a shadow effect 750 to the edge of the part 711 of the UI element 710 according to the above-described embodiment (i.e., the partial adaptive shadow method) can improve the visibility of the UI element 710. In this case, the part to which the shadow effect 750 is applied may be a word or character unit. For example, as shown in FIG. 7B, the shadow effect may be applied in word units such as "August" and "27". Alternatively, the shadow effect may be applied on a character basis. For example, the shadow effect may be applied to only "u", "s", "t", "2", and "7", overlapped with the portion 741 of the second ROI 740, in "August 27" which is the part 711 of the UI element 710.

Referring to FIG. 7C, when the UI element 710 is represented on a third ROI 760, the UI element 710 is not generally recognized. However, interposing an intermediate layer 770 between the UI element 710 and the third ROI 760 according to the above-described embodiment (i.e., the adaptive layout method) can improve the visibility of the UI element 710.

Figure 8:
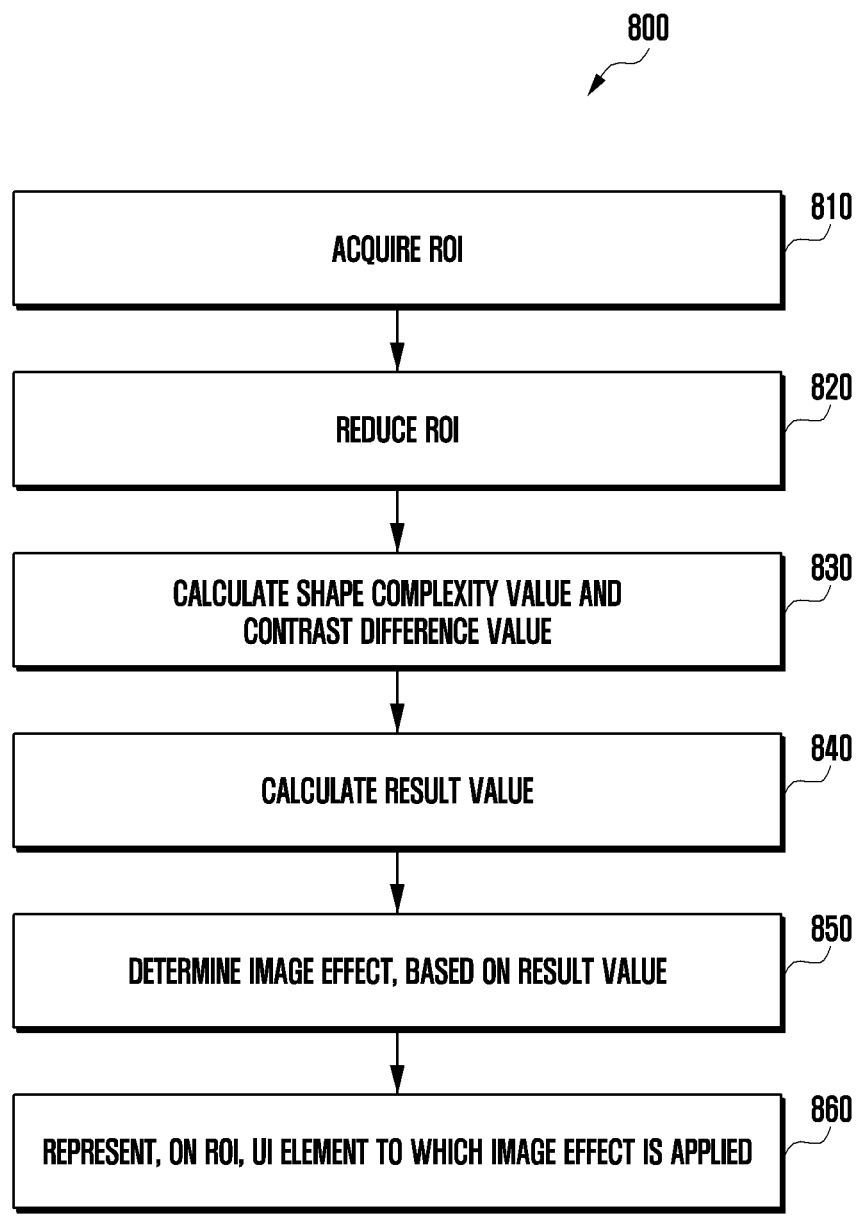
FIG. 8 is a flow diagram illustrating operations of a processor to secure visibility according to certain embodiments.

FIG. 8 is a flow diagram illustrating operations 800 of a processor 120 to secure visibility according to certain embodiments. For convenience, operations that overlap those described above are briefly described. Referring to FIG. 8, the processor 120 may perform the operations 800 by using the above-described modules 210, 220, 230, 240, 250, and 260.

At operation 810, the processor 120 may acquire the ROI in the image designated as the background of the screen.

At operation 820, the processor 120 may reduce the ROI in size by a given ratio. In addition, the processor 120 may perform grayscale conversion on the reduced ROI and removal of frequency components below a predetermined reference value.

At operation 830, the processor 120 may calculate the shape complexity value (e.g., the above-described operation 340) for the ROI that has passed through the operation 820. In addition, at the operation 830, the processor 120 may calculate the contrast difference value (e.g., the above-described operation 430) related to the ROI acquired at the operation 810.

At operation 840, the processor 120 may calculate the result value (e.g., the x value in FIG. 5), indicating the degree of the visibility of the UI element by using the shape complexity value and the contrast difference value.

At operation 850, the processor 120 may determine the image effect to be applied to the UI element, based on the result value. For example, when the result value is greater than or equal to a predetermined reference value (e.g., the fourth reference value), the processor 120 may determine the image effect as the adaptive layout method (e.g., to the exclusion of other methods), or both the adaptive layout method and the adaptive shadow method. When the result value is smaller than the reference value, the processor 120 may determine the image effect as the adaptive shadow method. For example, at least one of 1) case where the Max-Min difference value is greater than or equal to a predetermined reference value (e.g., the first reference value), 2) case where the shape complexity value is smaller than a predetermined reference value (e.g., the second reference value), or 3) case where the contrast difference value is smaller than a predetermined reference value (e.g., the third reference value) is satisfied, the processor 120 may determine the image effect as the partial adaptive shadow method. On the contrary, when at least one of 1) case where the Max-Min difference value is smaller than the first reference value, 2) case where the shape complexity value is greater than or equal to the second reference value, or 3) case where the contrast difference value is greater than or equal to the third reference value is satisfied, the processor 120 may determine the image effect as the general adaptive shadow method.

At operation 860, the processor 120 may represent, on the ROI, the UI element to which the determined image effect (e.g., the shadow effect 730 of FIG. 7A, the shadow effect 750 of FIG. 7B, or the layer 770 of FIG. 7C) is applied.

According to certain embodiments, an electronic device may include a display; a processor operatively connected to the display; and a memory operatively connected to the processor. The memory may store instructions that cause, when executed, the processor to acquire, in an image designated as a background of a screen to be represented on the display, a region of interest (ROI) at which a user interface (UI) element is to be located, to calculate a value indicating a shape complexity of the ROI, to divide the ROI into a plurality of clusters according to each designated attribute, to calculate difference values indicating contrast between the clusters and the UI element, to determine a smallest difference value among the difference values as a contrast difference value, to calculate, using the shape complexity value and the contrast difference value, a result value indicating a degree of visibility of the UI element, to determine an image effect to be applied to the UI element, based on the result value, and to represent, on the ROI, the UI element to which the image effect is applied.

The instructions may cause the processor to apply a shadow effect to an edge of at least a part of the UI element.

The instructions may cause the processor to adjust a size and/or opacity of a shadow to be applied to the edge, based on the result value.

The instructions may cause the processor to calculate a Max-Min difference value between a smallest difference value and a greatest difference value among the difference values, and to apply the shadow effect to an edge of a portion overlapped with a cluster corresponding to the contrast difference value in the UI element, based on both the result value being smaller than a first predetermined reference value and the Max-Min difference value being greater than or equal to a second predetermined reference value.

The instructions may cause the processor to apply the shadow effect to an edge of the entire UI element, based on both the result value being smaller than the first predetermined reference value and the Max-Min difference value being smaller than the second predetermined reference value.

The instructions may cause the processor to interpose an intermediate layer between the background and the UI element, based on the result value being greater than or equal to a first predetermined reference value.

The instructions may cause the processor to generate a first image by reducing the ROI and converting the ROI to grayscale, to generate a second image by removing a pixel value having a low frequency than a predetermined reference value from the first image, and to calculate an average of pixel values of the second image as the shape complexity value.

The instructions may cause the processor to exclude a cluster occupying the ROI at a ratio below a threshold when calculating the difference values indicating contrast between the clusters and the UI element.

The instructions may cause the processor to represent, on the display, a setting menu that allows a user to select the ROI.

The instructions may cause the processor to represent, on the display, a setting menu that allows a user to select a color of the UI element.

The attribute may be at least one of hue, saturation, and value.

The instructions may cause the processor to divide the ROI into the plurality of clusters, based on the hue (H), the saturation (S), and the value (V).

According to certain embodiments, a method for operating an electronic device may include operations of acquiring, in an image designated as a background of a screen to be represented on a display, a region of interest (ROI) at which a user interface (UI) element is to be located; calculating a value indicating a shape complexity of the ROI; dividing the ROI into a plurality of clusters according to each designated attribute; calculating difference values indicating contrast between the clusters and the UI element; determining a smallest difference value among the difference values as a contrast difference value; calculating, using the shape complexity value and the contrast difference value, a result value indicating a degree of visibility of the UI element; determining an image effect to be applied to the UT element, based on the result value; and representing, on the ROI, the UI element to which the image effect is applied.

The method may further include an operation of adjusting a size and/or opacity of a shadow to be applied to an edge of at least a part of the UI element, based on the result value.

The method may further include operations of calculating a Max–Min difference value between a smallest difference value and a greatest difference value among the difference values; applying a shadow effect to an edge of a portion overlapped with a cluster corresponding to the contrast difference value in the UI element, based on both the result value being smaller than a first predetermined reference value and the Max–Min difference value being greater than or equal to a second predetermined reference value; and applying the shadow effect to an edge of the entire UI element, based on both the result value being smaller than the first predetermined reference value and the Max–Min difference value being smaller than the second predetermined reference value.

The method may further include an operation of interposing an intermediate layer between the background and the UI element, based on the result value being greater than or equal to a first predetermined reference value.

The operation of calculating the shape complexity value may include operations of generating a first image by reducing the ROI and converting the ROI to grayscale; generating a second image by removing a pixel value having a low frequency than a predetermined reference value from the first image; and calculating an average of pixel values of the second image as the shape complexity value.

The method may further include an operation of excluding a cluster occupying the ROI at a ratio below a threshold when calculating the difference values indicating contrast between the clusters and the UI element.

While the disclosure has been particularly shown and described with reference to example embodiments thereof, it will be understood by those skilled in the art that various changes in form and details may be made therein without departing from the subject matter as defined by the appended claims.

What is claimed is:

1. An electronic device, comprising:
   a display;
   a processor operatively connected to the display; and
   a memory operatively connected to the processor,
   wherein the memory stores instructions that cause, when executed, the processor to:
   acquire, in a background image of a screen generated for display on the display, a region of interest (ROI) where a user interface (UI) element is to be displayed,
   calculate a value indicating a shape complexity of the ROI,
   divide the ROI into a plurality of clusters according to designated attributes for each of the plurality of clusters,
   calculate difference values indicating a contrast between each of the plurality of clusters and the UI element,
   identify a minimum difference value from among the difference values and setting the identified minimum difference value as a contrast difference value,
   calculate, using the shape complexity value and the contrast difference value, a result value indicating a degree of visibility of the UI element relative to the background image,
   determine an image effect to be applied to the UI element based on the result value, and
   display to the ROI the UI element to which the image effect is applied.

2. The electronic device of claim 1, wherein the image effect includes a shadow effect applied to an edge of at least a part of the UI element.

3. The electronic device of claim 2, wherein the image effect includes: adjusting a size and/or opacity of a shadow to be applied to the edge, based on the result value.

4. The electronic device of claim 2, wherein the instructions cause the processor to:
   calculate a Max–Min difference value between the minimum difference value and a maximum difference value from among the difference values, and
   apply the shadow effect to an edge of a portion of the UI element overlapping a cluster corresponding to the contrast difference value in the UI element, based on determining that the result value is smaller than a first predetermined reference value, and the Max–Min difference value is greater than or equal to a second predetermined reference value.

5. The electronic device of claim 4, wherein the instructions cause the processor to:
   apply the shadow effect to an edge of an entirety of the UI element, based on determining that the result value is less than the first predetermined reference value, and the Max–Min difference value is less than the second predetermined reference value.

6. The electronic device of claim 1, wherein the instructions cause the processor to:
   interpose an intermediate layer between the background and the UI element for display, based on determining that the result value is greater than or equal to a first predetermined reference value.

7. The electronic device of claim 1, wherein the instructions cause the processor to:
   generate a first image by reducing a size of the ROI and converting the reduced-size ROI to grayscale, generate a second image by removing, from the first image, a pixel value having a frequency lower than a predetermined reference value, and calculate an average pixel value of the generated second image and setting the calculated average pixel value as the shape complexity value.

8. The electronic device of claim 1, wherein the instructions cause the processor to:

exclude a first cluster from among the plurality of clusters when the first cluster occupies a portion of the ROI below a threshold occupation ratio, when calculating the difference values indicating contrast between the clusters and the UI element.

9. The electronic device of claim 1, wherein the screen is a home screen or a lock screen.

10. The electronic device of claim 1, wherein the UI element includes a text, a button, an icon, or an emoticon.

11. The electronic device of claim 1, wherein the instructions cause the processor to:

display, on the display, a setting menu allowing a user to select the ROI.

12. The electronic device of claim 1, wherein the instructions cause the processor to:

display, on the display, a setting menu that allows a user to select a color of the UI element.

13. The electronic device of claim 1, wherein the designated attributes include at least one of hue, saturation, and value.

14. The electronic device of claim 13, wherein the ROI is divided into the plurality of clusters based on the hue (H), the saturation (S), and the value (V).

15. A method for operating an electronic device, the method comprising:

acquiring a background image of a screen generated for display on the display, a region of interest (ROI) where a user interface (UI) element is to be displayed;

calculating a value indicating a shape complexity of the ROI;

dividing the ROI into a plurality of clusters according to designated attributes for each of the plurality of clusters;

calculating difference values indicating a contrast between each of the plurality of clusters and the UI element;

identifying a minimum difference value from among the difference values and setting the identified minimum difference value as a contrast difference value;

calculating, using the shape complexity value and the contrast difference value, a result value indicating a degree of visibility of the UI element relative to the background image;

determining an image effect to be applied to the UI element, based on the result value; and display to the ROI the UI element to which the image effect is applied.

16. The method of claim 15, further comprising: adjusting a size and/or opacity of a shadow to be applied to an edge of at least a part of the UI element, based on the result value.

17. The method of claim 15, further comprising:

calculating a Max–Min difference between the minimum difference value and a maximum difference value from among the difference values;

applying a shadow effect to an edge of a portion of the UI element overlapping a cluster corresponding to the contrast difference value in the UI element, based on determining that the result value is smaller than a first predetermined reference value and the Max–Min difference value is greater than or equal to a second predetermined reference value; and applying the shadow effect to an edge of an entirety of the UI element, based on determining that the result value is less than the first predetermined reference value and the Max–Min difference value is less than the second predetermined reference value.

18. The method of claim 15, further comprising:

interposing an intermediate layer between the background and the UI element for display, based on determining that the result value is greater than or equal to a first predetermined reference value.

19. The method of claim 15, wherein calculating the shape complexity value includes:

generating a first image by reducing a size of the ROI and converting the reduced-size ROI to grayscale;

generating a second image by removing, from the first image, a pixel value having a frequency lower than a predetermined reference value; and calculating an average pixel value of the generated second image and setting the calculated average pixel value as the shape complexity value.

20. The method of claim 15, further comprising:

excluding a first cluster from among the plurality of clusters when the first cluster occupies a portion of the ROI below a threshold occupation ratio, when calculating the difference values indicating contrast between the clusters and the UI element.

* * * * *